(12) United States Patent
Du

(10) Patent No.: US 12,324,980 B2
(45) Date of Patent: Jun. 10, 2025

(54) HANDLE, OPERATING ROD THRESHOLD ADJUSTING METHOD, ADJUSTING SYSTEM, AND ADJUSTING DEVICE

(71) Applicant: GOERTEK INC., Shandong (CN)

(72) Inventor: Wenbin Du, Shandong (CN)

(73) Assignee: GOERTEK INC., Shandong (CN)

( * ) Notice: Subject to any disclaimer, the term of this patent is extended or adjusted under 35 U.S.C. 154(b) by 274 days.

(21) Appl. No.: 18/044,690

(22) PCT Filed: Nov. 27, 2020

(86) PCT No.: PCT/CN2020/132232
§ 371 (c)(1),
(2) Date: Mar. 9, 2023

(87) PCT Pub. No.: WO2022/062167
PCT Pub. Date: Mar. 31, 2022

(65) Prior Publication Data
US 2023/0372810 A1 Nov. 23, 2023

(30) Foreign Application Priority Data

Sep. 22, 2020 (CN) .......................... 202011001331.9

(51) Int. Cl.
*A63F 13/22* (2014.01)
*A63F 13/214* (2014.01)

(52) U.S. Cl.
CPC ............ *A63F 13/22* (2014.09); *A63F 13/214* (2014.09); *A63F 2300/1043* (2013.01); *A63F 2300/1068* (2013.01)

(58) Field of Classification Search
CPC .................... A63F 13/22; A63F 13/214; A63F 2300/1043; A63F 2300/1068
(Continued)

(56) References Cited

U.S. PATENT DOCUMENTS 6,743,100 B1 * 6/2004 Neiser ..................... A63F 13/24
463/37
8,077,057 B2 * 12/2011 Ohshita ............... G06F 3/03547
345/173
(Continued)

FOREIGN PATENT DOCUMENTS

| CN | 1305138 A | 7/2001 |
|---|---|---|
| CN | 1652054 A | 8/2005 |

(Continued)

*Primary Examiner* — Allen Chan
(74) *Attorney, Agent, or Firm* — LKGlobal | Lorenz & Kopf, LLP

(57) ABSTRACT

A handle and a method, system and device for adjusting an operating rod threshold value are disclosed. The method for adjusting an operating rod threshold value comprises: acquiring position data of palm feature points when a user is grasping a gripping portion of a handle (S1); obtaining palm size data according to the position data of the palm feature points (S2); judging whether the operating rod threshold value of the handle is within a suitable operating threshold range corresponding to the palm size data, and if not, adjusting the operating rod threshold value so that the operating rod threshold value after adjusted is suitable for the user (S3). The method for adjusting an operating rod threshold value can adjust the operating rod threshold value of the operating rod of the handle according to the palm size of different users, thereby improving the operational comfort of users.

19 Claims, 7 Drawing Sheets

(58) Field of Classification Search
USPC .......................................................... 463/38
See application file for complete search history.

(56) References Cited

U.S. PATENT DOCUMENTS

| | | | | |
|---|---|---|---|---|
| 8,172,675 | B2* | 5/2012 | Migos | G06F 21/34 |
| | | | | 463/31 |
| 9,267,809 | B2* | 2/2016 | Karasawa | B60R 16/023 |
| 9,387,397 | B2* | 7/2016 | Goh | G06F 30/17 |
| 9,389,684 | B2* | 7/2016 | Sebastian | G06F 3/014 |
| 2003/0074766 | A1 | 4/2003 | Tillim | |
| 2005/0168452 | A1 | 8/2005 | Sunadome et al. | |
| 2013/0257732 | A1 | 10/2013 | Duffield | |

FOREIGN PATENT DOCUMENTS

| | | | |
|---|---|---|---|
| CN | 102760232 | A | 10/2012 |
| CN | 106151193 | A | 11/2016 |
| CN | 106951174 | A | 7/2017 |
| CN | 206980059 | U | 2/2018 |
| CN | 207950655 | U | 10/2018 |
| CN | 109739358 | A | 5/2019 |
| CN | 109977791 | A | 7/2019 |
| IN | 104391646 | A | 3/2015 |
| WO | 2002088865 | A1 | 11/2002 |

\* cited by examiner

HANDLE, OPERATING ROD THRESHOLD ADJUSTING METHOD, ADJUSTING SYSTEM, AND ADJUSTING DEVICE

CROSS-REFERENCE TO RELATED APPLICATIONS

This Application is a U.S. National-Stage entry under 35 U.S.C. § 371 based on International Application No. PCT/CN2020/132232, filed Nov. 27, 2020 which was published under PCT Article 21(2) and which claims priority to Chinese Application No. 202011001331.9, filed Sep. 22, 2020, which are all hereby incorporated herein in their entirety by reference.

TECHNICAL FIELD

This application pertains to the technical field of an intelligent handle, in particular to a handle, a method for adjusting an operating rod threshold value, a system for adjusting an operating rod threshold value and a device for adjusting an operating rod threshold value.

BACKGROUND

At present, the handle usually comprises two gripping portions to be held by the left and right hands respectively. A connecting plate body is provided between the two gripping portions, and is provided thereon with two operating rods (i.e., left and right operating rods) of the handle. The operating rods of the handle can realize the movement in four directions of front, back, left and right (i.e., as a push rod), or the top of the operating rod of the handle can swing with the bottom as the center (i.e., as a rocker), thereby realizing different functions.

The push rod has a limit stroke in the front, back, left or right direction. In each direction, the limit stroke corresponds to an operating rod threshold value, that is, the push rod that can move in four directions should have four operating rod threshold values. During the use, the user controls the push rod to move to different strokes (i.e., reach different percentages of the operating rod threshold value) to realize different effects.

The motion mode of the rocker can be regarded as a circular motion of the top around a fixed center, and the radius of the circle is the limit stroke of the rocker, and the limit stroke corresponds to the operating rod threshold value. Obviously, as there are countless radii of the circle, the number of the operating rod threshold values of the rocker are also countless. The difference between the push rod and the rocker is that, the four operating rod threshold values of the push rod are distributed in a discrete manner on the plane where the handle is located, while the countless operating rod threshold values of the rocker may be integrated into a disc shape on the plane where the handle is located.

Here, only one function of the push rod is taken as an example. When the push rod moves rightward to the limit stroke, that is, when the operating rod threshold value in this direction is reached, the current viewing angle turns 90° rightward. When the push rod moves rightward to ½ of the limit stroke, that is, to ½ of the operating rod threshold value in this direction, the current viewing angle will turn 45° rightward. Obviously, for other strokes in this direction (i.e., reaching other percentages of the operating rod threshold value), the rotation amount of the viewing angle will change accordingly. At the same time, for the strokes in other directions (other different operating rod threshold values), the rotation direction of the viewing angle will change accordingly, which will not be explained in detail here.

For the operating rod of the handle in the prior art, its position is fixed relative to the gripping portion, and the operating rod threshold values are also fixed. Continuing with the example above, when the current viewing angle needs to be turned 90° rightward, the operating rod of the handle must be pushed rightward to the limit stroke (the operating rod threshold value in this direction must be reached). However, for users with smaller palm size, it is difficult to push the operating rod of the handle rightward to the limit stroke, which affects the operation effect. And for users with larger palm size, after pushing the handle rod rightward to the limit stroke, the finger still remains in a curled state, which affects the operational hand feel.

In sum, it is a technical problem for those skilled in the art to consider how to provide a handle that is suitable for users with different palm sizes. In addition, other objects, desirable features and characteristics will become apparent from the subsequent summary and detailed description, and the appended claims, taken in conjunction with the accompanying drawings and this background.

SUMMARY

An object of the present disclosure is to provide a handle, a method for adjusting an operating rod threshold value, a system for adjusting an operating rod threshold value and a device for adjusting an operating rod threshold value, which can adjust the operating rod threshold value of the operating rod of the handle according to the palm size of different users, thereby improving the operational comfort of users.

To achieve the object, the present disclosure provides a method for adjusting an operating rod threshold value, comprising:
  acquiring position data of palm feature points when a user is grasping a gripping portion of a handle;
  obtaining palm size data according to the position data of the palm feature points;
  judging whether the operating rod threshold value of the handle is within a suitable operating threshold range corresponding to the palm size data, and if not, adjusting the operating rod threshold value so that the operating rod threshold value after adjusted is suitable for the user.

Optionally, the position data of the palm feature points comprise: position data of multiple edge points of the palm, and position data of three finger webs between four fingers except the thumb.

Optionally, the position data of the palm feature points comprise: position data of index finger, middle finger, ring finger and little finger of the palm;
  the step of obtaining palm size data according to the position data of the palm feature points comprises:
  when it is judged from the position data of index finger, middle finger, ring finger and little finger that the index finger and middle finger are located on a front surface of the gripping portion, and the ring finger and little finger are located on a bottom surface of the gripping portion, obtaining a preset first palm size data as the palm size data;
  when it is judged from the position data of index finger, middle finger, ring finger and little finger that only the index finger is located on the front surface of the gripping portion, and the middle finger, ring finger and little finger are all located on the bottom surface of the gripping portion, obtaining a preset second palm size data as the palm size data, wherein a palm size corresponding to the second palm size data is smaller than a palm size corresponding to the first palm size data; and when it is judged from the position data of index finger, middle finger, ring finger and little finger that the index finger, middle finger, ring finger and little finger are all located on the bottom surface of the gripping portion, obtaining a preset third palm size data as the palm size data, wherein a palm size corresponding to the third palm size data is smaller than the palm size corresponding to the second palm size data.

Optionally, the step of judging whether the operating rod threshold value of the operating rod of the handle is within a suitable operating threshold range corresponding to the palm size data comprises:

determining a palm size range in which the palm size data is located;

determining a corresponding suitable operating threshold range according to the palm size range; and judging whether the operating rod threshold value of the operating rod of the handle is within the suitable operating threshold range.

Optionally, the step of adjusting the operating rod threshold value so that the operating rod threshold value after adjusted is suitable for the user comprises:

when the palm size data is smaller than a palm size data corresponding to the operating rod threshold value of the operating rod of the handle, decreasing different operating rod threshold values gradually in a trend of gradually decreasing adjustment amplitudes in a direction that faces toward the gripping portion;

when the palm size data is larger than a palm size data corresponding to the operating rod threshold value of the operating rod of the handle, increasing different operating rod threshold values in a direction that faces away from the gripping portion in a trend of gradually increasing an adjustment amplitude.

Optionally, the step of adjusting the operating rod threshold value so that the operating rod threshold value after adjusted is suitable for the user comprises:

according to suitable operating threshold ranges respectively corresponding to the palm size data of the left and right hands, adjusting respectively the operating rod threshold values of left and right operating rods of the handles to middle values of their corresponding suitable operating threshold ranges, so that the operating rod threshold values after adjusted are suitable for the user.

Optionally, the step of adjusting the operating rod threshold value so that the operating rod threshold value after adjusted is suitable for the user comprises:

according to a suitable operating threshold range corresponding to the palm size data of a smaller hand in the left and right hands, adjusting the operating rod threshold values of left and right operating rods of the handles to a middle value of the suitable operating threshold range, so that the operating rod threshold values after adjusted are suitable for the user.

The present disclosure also provides a system for adjusting an operating rod threshold value, comprising:

an acquiring unit for acquiring position data of palm feature points when a user is grasping a gripping portion of a handle;

a calculating unit for obtaining palm size data according to the position data of the palm feature points;

a judging unit for judging whether the operating rod threshold value of the operating rod of the handle is within a suitable operating threshold range corresponding to the palm size data; and an adjusting unit for adjusting the operating rod threshold when the operating rod threshold value of the operating rod of the handle is not within the suitable operating threshold range corresponding to the palm size data, so that the operating rod threshold value after adjusted is suitable for the user.

The present disclosure further provides a device for adjusting an operating rod threshold value, comprising:

a memory for storing a computer program; and a processor for implementing the steps of any one of the methods for adjusting an operating rod threshold value as described above when executing the computer program.

The present disclosure further provides a handle, which comprises the device for adjusting an operating rod threshold value as described above. It further comprises a size collecting module for collecting a palm size data of a user.

Unlike the prior art mentioned above, in the method for adjusting an operating rod threshold value according to an embodiment of the present disclosure, first, the position data of palm feature points when a user is grasping a gripping portion of a handle is acquired; then, the palm size data is obtained according to the position data of the palm feature points; then, it is judged whether the operating rod threshold value of the handle is within a suitable operating threshold range corresponding to the palm size data, and if not, it indicates that the current operating rod threshold value is not suitable for the user, and the operating rod threshold value should be adjusted so that the operating rod threshold value after adjusted is suitable for the user, thereby meeting the control needs of users with different palm sizes during operation and significantly improving the operation comfort. It can be seen that for users with smaller palm sizes, the operating rod threshold values will be decreased accordingly, and fingers can easily move the operating rods to the positions corresponding to the operating rod threshold values to achieve corresponding functions. Similarly, for users with larger palm sizes, the operating rod threshold values will be increased accordingly. When the fingers are required to move the operating rod to the positions corresponding to the operating rod threshold values, the fingers can extend fully, thereby improving the operation comfort and avoiding affecting the operational hand feel.

An embodiment of the present disclosure also provides a system for adjusting an operating rod threshold value, a device for adjusting an operating rod threshold value and a handle, and they all have the beneficial effects as described above, which will not be repeated here.

BRIEF DESCRIPTION OF DRAWINGS

The present invention will hereinafter be described in conjunction with the following drawing figures, wherein like numerals denote like elements, and:

FIG. 2 (b) is a schematic diagram of relative positions of the palm and the handle when it is judged that the palm size data is a preset second hand size data in the method for adjusting an operating rod threshold value according to an embodiment of the present disclosure;

FIG. 2 (c) is a schematic diagram of relative positions of the palm and the handle when it is judged that the palm size data is a preset third palm size data in the method for adjusting an operating rod threshold value according to an embodiment of the present disclosure;

Figure 1:
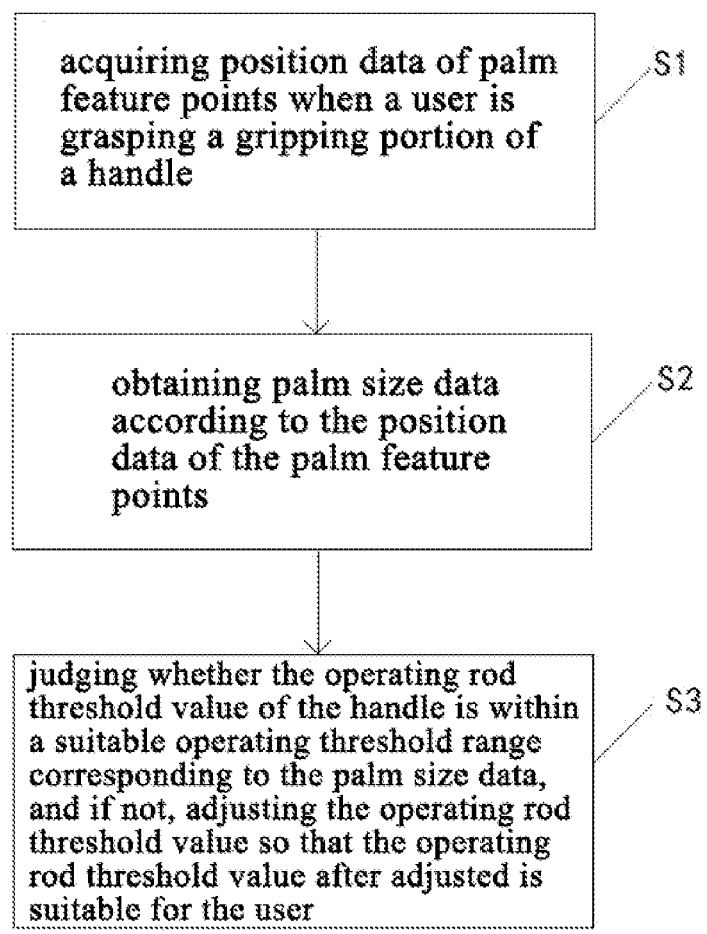
FIG. 1 is a flowchart of a method for adjusting an operating rod threshold value according to an embodiment of the present disclosure.

In the drawings: 1, first gripping portion; 2, second gripping portion; 31, left operating rod, 32, right operating rod; 4, palm size collection panel; 51, first sliding rheostat, 52, second sliding rheostat; 6, controller; 101, acquiring unit; 102, computing unit; 103, judging unit; 104, adjusting unit.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described clearly and completely below with reference to the drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

In order to enable those skilled in the art to better understand the solution of the present disclosure, the present disclosure is further described in detail below in combination with the drawings and specific embodiments.

An embodiment of the present disclosure provides a method for adjusting an operating rod threshold value, as shown in FIG. 1, which comprises:

S1. acquiring position data of palm feature points when a user is grasping a gripping portion of a handle;

S2. obtaining palm size data according to the position data of the palm feature points;

S3. judging whether the operating rod threshold value of the handle is within a suitable operating threshold range corresponding to the palm size data, and if not, adjusting the operating rod threshold value so that the operating rod threshold value after adjusted is suitable for the user.

As for the step S1, the palm size data of one palm (left hand or right hand) of the user may be acquired. Generally speaking, the sizes of two palms of a user are not much different, so either palm can be selected to acquire the palm size data.

At the same time, the position data of the palm feature points acquired should be the position data of the palm feature points when the user is grasping the gripping portion of the handle. In other words, when the user needs to manipulate the handle and is grasping the gripping portion of the handle, the position data of the user's palm feature points are acquired. In this way, when the hand is grasping the gripping portion, the position data of the palm feature points acquired in this state can better reflect the state of the hand when manipulating the handle, thereby making the palm size data acquired true and reliable.

As for the step S2, the palm size data is obtained according to the position data of palm feature points. Obviously, the position data of the palm feature points can reflect the palm size, and then the palm size data can be obtained. Specifically, the position data of palm feature points may be the position data of the edge points of the whole palm. The position data of all the edge points reflect the positions of all the edge points. All the edge points form the outer contour of the palm, so the palm size, that is, the palm size data, can be obtained.

As for the step S3, in short, the operating rod threshold value of the handle can be adjusted according to different palm sizes, thereby meeting the manipulating needs of users with different palm sizes during operation, and significantly improving the comfort.

Obviously, if the palm size data obtained is smaller, the operating rod threshold should be smaller; if the palm size data obtained is larger, the operating rod threshold should be larger. In this way, users with different palm sizes can operate the handle comfortably without affecting the feel of operation due to different palm sizes. At the same time, the applicability of the handle may be greatly improved.

Figure 5:
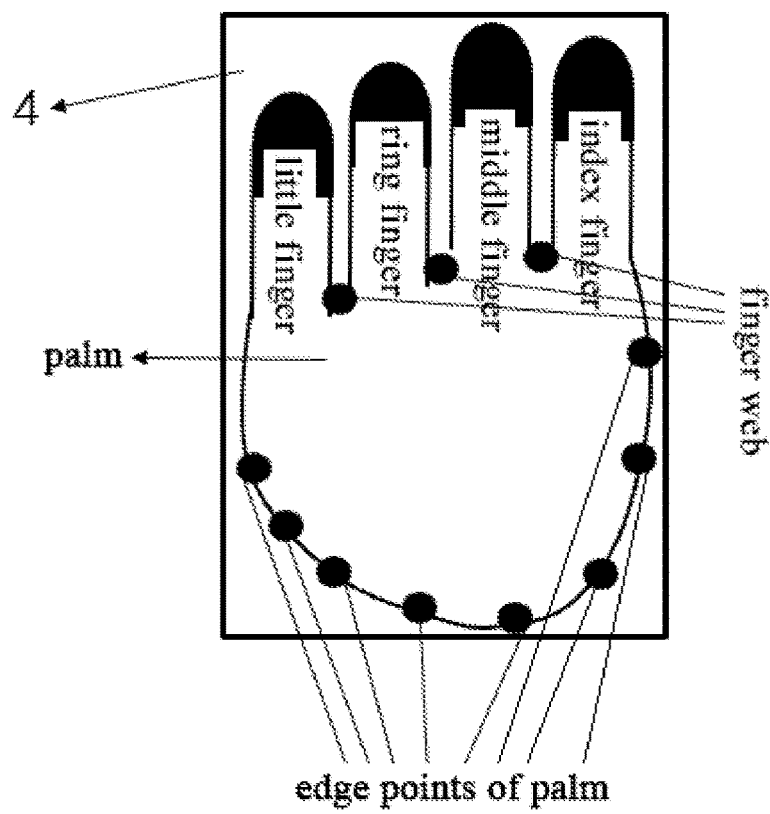
FIG. 5 is a schematic diagram of a size collecting module of the handle according to an embodiment of the present disclosure in the process of collecting the palm size data of the user.

As for the palm size data mentioned above, in addition to the position data of the edge points of the whole palm, in order to simplify the data processing, it may also be the position data of multiple edge points of the palm and the position data of three finger webs between four fingers except the thumb, as shown in FIG. 5.

It can be seen that the palm size data can exclude the position data of edge points of the fingers, and the palm size data may be obtained by acquiring the position data of multiple edge points of the palm and the position data of three finger webs between four fingers except the thumb. Then, the operating rod threshold value corresponding to the palm size data may be used as the judgment basis to judge whether the current operating rod threshold value is within the operating rod threshold value.

The specific number of multiple edge points of the palm may be determined according to the actual needs, and the spacing between two adjacent edge points may be set in different ways as long as all the edge points can roughly reflect the size of the palm.

For different users, the positions of three finger webs between four fingers except the thumb are fixed. When the user is grasping the gripping portion of the handle, the position of the three finger webs will be determined, and in combination with the multiple edge points of the palm, the palm size data can be obtained, and then the step S3 can be executed.

Figure 2A:
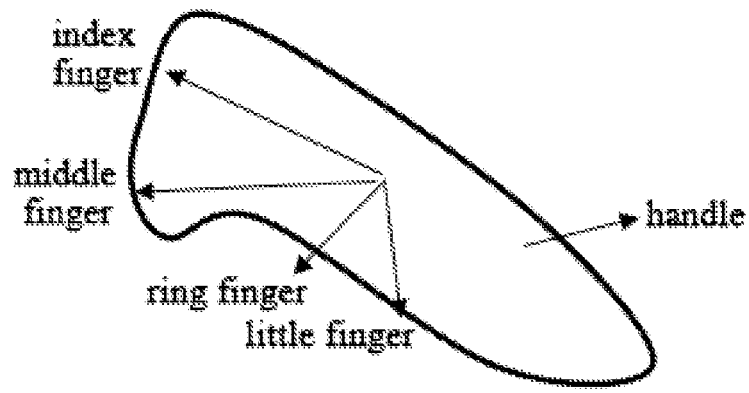
FIG. 2 (a) is a schematic diagram of relative positions of a palm and a handle when it is judged that the palm size data is a preset first palm size data in the method for adjusting an operating rod threshold value according to an embodiment of the present disclosure.
Figure 2B:
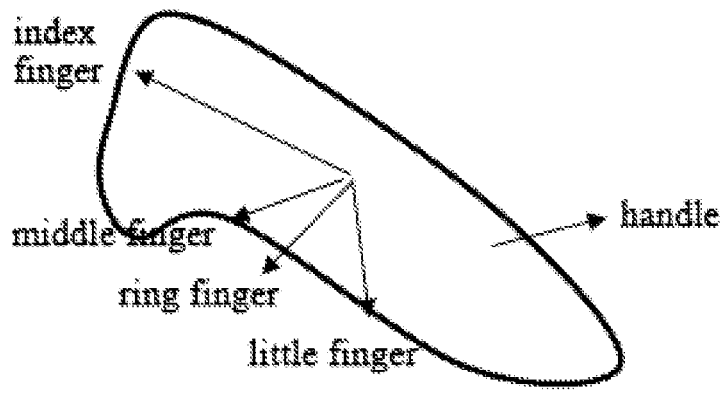
Figure 2C:
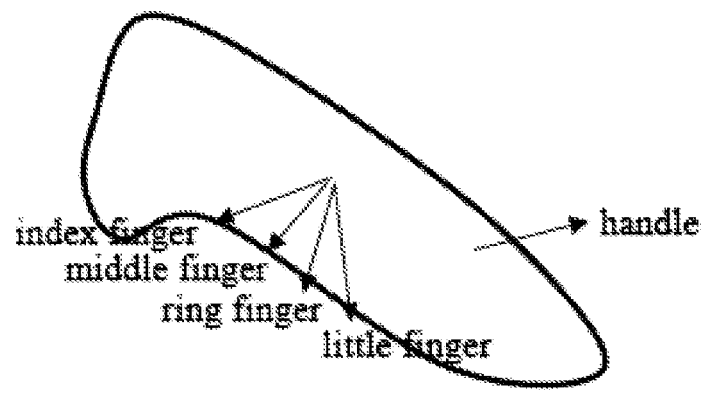

Referring to FIGS. 2 (a) to 2 (c), in order to further reduce the complexity of data processing, the position data of palm feature points may further comprise the position data of index finger, middle finger, ring finger and little finger of the palm. The position data may be specifically the position of the tip or pulp of the finger, preferably the position of the pulp of the finger.

As shown in FIG. 2 (a), according to the position data of the four fingers, when it is judged that the index finger and middle finger are located on a front surface of the gripping portion, and the ring finger and little finger are located on a bottom surface of the gripping portion, a preset first palm size data is obtained as the palm size data.

As shown in FIG. 2 (b), according to the position data of the four fingers, when it is judged that only the index finger is located on the front surface of the gripping portion, and the middle finger, ring finger and little finger are located on the bottom surface of the gripping portion, a preset second palm size data is obtained as the palm size data, and a palm size corresponding to the second palm size data is smaller than a palm size corresponding to the first palm size data.

As shown in FIG. 2 (c), according to the position data of the four fingers, when it is judged that the index finger, middle finger, ring finger and little finger are all located on the bottom surface of the gripping portion, a preset third palm size data is obtained as the palm size data, and a palm size corresponding to the third palm size data is smaller than a palm size corresponding to the second palm size data.

In sum, since the palm size corresponding to the second palm size data is smaller than the palm size corresponding to the first palm size data, and the palm size corresponding to the third palm size data is smaller than the palm size corresponding to the second palm size data, the operating rod threshold value corresponding to the second palm size data should be less than the operating rod threshold value corresponding to the first palm size data, and the operating rod threshold value corresponding to the palm size data of the third palm should be less than the operating rod threshold value corresponding to the palm size data of the second palm.

It can be seen that if the position data of the palm feature points is set in this way, the palm size data can be determined only by judging the positions of the four fingers without acquiring the position data of multiple edge points of the palm.

Obviously, three palm size data (the first palm size data, second palm size data and third palm size data) may be obtained according to the positions of the four fingers above, and the palm sizes corresponding to the three palm size data are different, which can cover gripping situations of most users, thereby greatly simplifying the data processing, quickly adjusting the operating rod threshold value of the handle, and further improving the operation experience.

As for the case that the handle comprises one operating rod, in the step S1, either palm may be selected to acquire the palm size data, and the steps S2 and S3 are executed according to the palm size data, that is, the operating rod threshold value of the operating rod of the handle is adjusted. Of course, the palm size data of two palms may also be obtained, and the steps S2 and S3 are executed according to the palm size data of one of palms.

Figure 4:
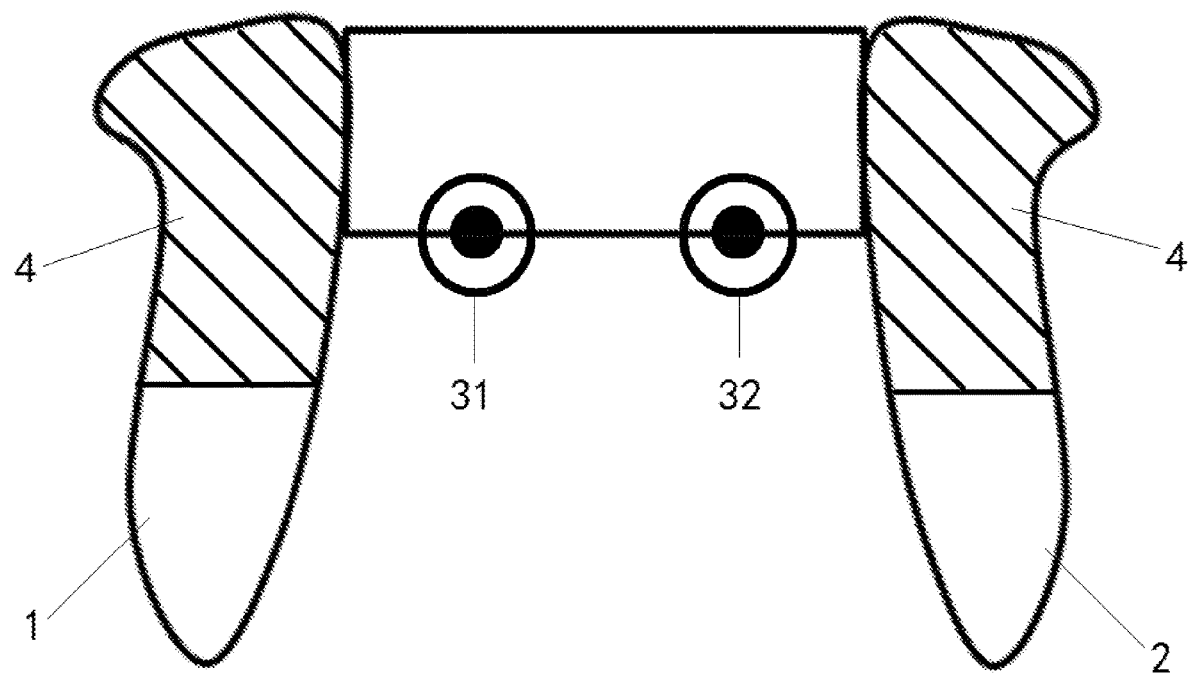
FIG. 4 is a schematic diagram of the handle according to an embodiment of the present disclosure.

As for the case that the handle comprises two operating rods, referring to FIG. 4, it may comprise a left operating rod 31 and a right operating rod 32. In the step S1, similarly, either palm may be selected to acquire the palm size data, and the steps S2 and S3 are executed according to the palm size data, that is, the operating rod threshold values of the two operating rods of the handle are adjusted according to one palm size data.

In addition, the palm size data of two palms may be obtained, and the operating rod threshold values of the operating rods of the handle may be respectively adjusted according to the palm size data corresponding to the palms. Namely, the operating rod threshold value of the left operating rod 31 is adjusted according to the palm size data of the left palm, and the operating rod threshold value of the right operating rod 32 is adjusted according to the palm size data of the right palm. Of course, it is also possible to judge the size relationship of two palms according to the acquired palm size data of two palms, and use the palm size data of one of the palms as a reference to adjust the operating rod threshold values of two operating rods of the handle. The specific setting method may refer to the embodiments described below.

As for "judging whether the operating rod threshold value of the handle is within a suitable operating threshold range corresponding to the palm size data" in step S3, each palm size data may correspond to a suitable operating threshold range, and the corresponding relationship between the palm size data and the suitable operating threshold range may be determined according to actual needs.

After the palm size data of the user which corresponds to a suitable operating threshold range is obtained, it is judged whether the current operating rod threshold value is within a suitable operating threshold range. If so, it indicates that the operating rod threshold value is suitable for the user, and there is no need to adjust the operating rod threshold value; if not, it indicates that the operating rod threshold value is not suitable for the user, and the operating rod threshold needs to be adjusted to be within a suitable operating threshold range.

Figure 6:
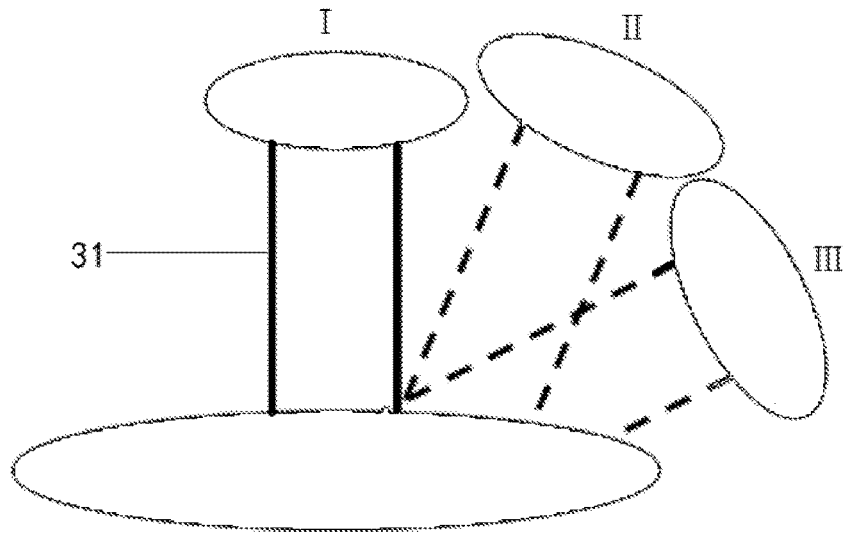
FIG. 6 is a front view of an operating rod of the handle according to an embodiment of the present disclosure when adjusting the operating rod threshold value.

Taking the orientation shown in FIG. 6 and the left operating rod 31 being a rocker as an example, the left operating rod 31 is in a vertical state when it is at the position I, and at this moment it is not manipulated. The position III is the original position of the limit stroke of the left operating rod 31 in the horizontal right direction, i.e., the position of the original operating rod threshold value.

After the steps S1 and S2 are executed, when it is judged that the operating rod threshold value of the operating rod of the handle is greater than the suitable operating threshold range corresponding to the palm size data, the operating rod threshold value of the operating rod of the handle should be decreased to make the operating rod threshold value after adjusted suitable for the user. At this moment, the position of the limit stroke of the left operating rod 31 may be adjusted to the position II, that is, the position of the operating rod threshold value is adjusted from the position III to the position II. In this way, when the user needs to push the left operating rod 31 to the limit stroke in the horizontal right direction, the left operating rod 31 need not to be pushed to the position III, but to the position II. At this moment, when the left operating rod 31 is at the position II, the effects that can be obtained is the same as the effect obtained when it was at the position III (when the operating rod threshold value is not adjusted).

Obviously, the step of "judging whether the operating rod threshold value of the operating rod of the handle is within a suitable operating threshold range corresponding to the palm size data" also implicitly discloses the acquisition of the operating rod threshold value of the operating rod of the handle. Only after the operating rod threshold value of the operating rod of the handle is acquired the subsequent judging step can be executed.

It can be seen that if each palm size data corresponds to a suitable operating threshold range, the operating rod threshold values of the operating rods of the handle can be accurately adjusted, which is suitable for the user with higher requirements for handle manipulation.

The step of judging whether the operating rod threshold value of the operating rod of the handle is within a suitable operating threshold range corresponding to the palm size data comprises:

determining a palm size range in which the palm size data is located;
determining a corresponding suitable operating threshold range according to the palm size range; and
judging whether the operating rod threshold value of the operating rod of the handle is within the suitable operating threshold range.

Here, each palm size range should correspond to a suitable operating threshold range, that is, multiple palm size data may correspond to one suitable operating threshold range, and the corresponding relationship between the palm size range and the suitable operating threshold range may also be determined according to actual needs.

Here, it is necessary to first determine a palm size range in which the palm size data is, then determine a suitable operating threshold range corresponding to the palm size range according to the palm size range, and finally determine whether the current operating rod threshold value of the operating rod of the handle is within the suitable operating threshold range.

It can be seen that if each palm size range should correspond to a suitable operating threshold range, the amount of data to be stored can be reduced. At the same time, since the adjustment accuracy of the operating rod threshold value is lower than the method in which each palm size data corresponds to a suitable operating threshold range, it is suitable for the user with low requirements for handle manipulation.

As for the method of adjusting the threshold values of the two operating rods, the palm size data when two hands grasp the first gripping portion 1 and the second gripping portion 2 respectively may be acquired first, and then subsequent steps are executed.

Specifically, when the handle needs to be operated, the user grasps the first gripping portion 1 with the left hand and the second gripping portion 2 with the right hand, and at this time the palm size data of the left hand and the palm size data of the right hand can be obtained.

Then, it is judged which hand is smaller according to the palm size data of the left hand and the right hand. Namely, the palm size of the left hand corresponding to the palm size data of the left hand is compared with the palm size of the right hand corresponding to the palm size data of the right hand, and it is determined whether the palm size of the left hand is smaller or the palm size of the right hand is smaller.

Finally, the palm size data corresponding to the smaller palm size is taken as the palm size data of the user. Namely, if the palm size of the left hand is smaller, the palm size data of the left hand will be taken as the palm size data of the user; if the palm size of the right hand is smaller, the palm size data of the right hand will be taken as the palm size data of the user. Then, according to the suitable operating threshold range corresponding to the palm size data, the operating rod threshold values of the left and right operating rods of the handle are adjusted to the middle value of the suitable operating threshold range, so that the operating rod threshold values after adjusted are suitable for the user.

For example, regarding the operating rod threshold value of a push rod, taking the above case of obtaining three palm size data according to the position of four fingers as an example, assume that the suitable operating threshold range corresponding to the first palm size data obtained is to tilt 30° to 40° with the origin (which may be the bottom of the push rod) as the center, namely, the user pushes the push rod with the origin as the center, and when the push rod is tilted 30° to 40°, the operating rod threshold value of the push rod is reached, and at this moment the corresponding function can be realized (for example, the angle of view is rotated to a limit position). However, the current operating rod threshold value of the push rod is to tilt 50° with the origin as the center, which indicates that at this moment the corresponding function can be realized only when the user pushes the push rod to tilt 50°. This obviously affects the operational comfort for users with smaller palm size. In other words, at this moment, the current operating rod threshold value of the push rod is not within the suitable operating threshold range corresponding to the first palm size data, and the operating rod threshold value of the push rod should be adjusted. Since the suitable operating threshold range is to tilt 30° to 40° with the origin (which may be the bottom of the push rod) as the center, the operating rod threshold will be directly adjusted from "to tilt 50° with the origin as the center" to "to tilt 35° (the middle value of 30° to 40°) with the origin as the center", so that the operating rod threshold value after adjusted is suitable for the user.

It can be seen that, in order to realize the operational comfort of smaller palms, by judging the sizes of two palms and using the smaller palm as the criteria for judging whether the operating rod threshold value is appropriate, the operational hand feel can be further improved, and inconvenience caused by smaller palms can be avoided.

In addition, regarding the mode of adjusting the operating rod threshold values of two operating rods as mentioned above, first, like the above, when the handle needs to be operated, the user grasps the first gripping portion 1 with the left hand and the second gripping portion 2 with the right hand, and at this moment, the palm size data of the left hand and the palm size data of the right hand can be obtained.

Then, the suitable operating threshold range of the left hand is obtained according to the palm size data of the left hand, and the suitable operating threshold range of the right hand is obtained according to the palm size data of the right hand. According to the suitable operating threshold range of the left hand, the operating rod threshold value of the left operating rod 31 is adjusted to the middle value of the suitable operating threshold range of the left hand; according to the suitable operating threshold range of the right hand, the operating rod threshold value of the right operating rod 32 is adjusted to the middle value of the suitable operating threshold range of the right hand. In this way, the left operating rod 31 and the right operating rod 32 are adjusted according to different palm sizes, thereby further improving the comfort in use.

In other words, no matter whether one palm size data corresponds to a suitable operating threshold range, or multiple palm size data corresponds to a suitable operating threshold range (i.e., each palm size range corresponds to a suitable operating threshold range), if the operating rod threshold value of the operating rod of the handle is not suitable for the palm size data (the operating rod threshold value of the left operating rod 31 is not suitable for the left hand size data, and/or the operating rod threshold value of the right operating rod 32 is not suitable for the right hand size data), the operating rod threshold value(s) of the operating rod(s) of the handle should be adjusted to the middle value(s) of the suitable operating threshold range(s).

It can be seen that in the above adjusting process, there is no need for human participation, and it can automatically stop at the middle value of the suitable operating threshold range, which is convenient for users to operate and highly intelligent.

Figure 7:
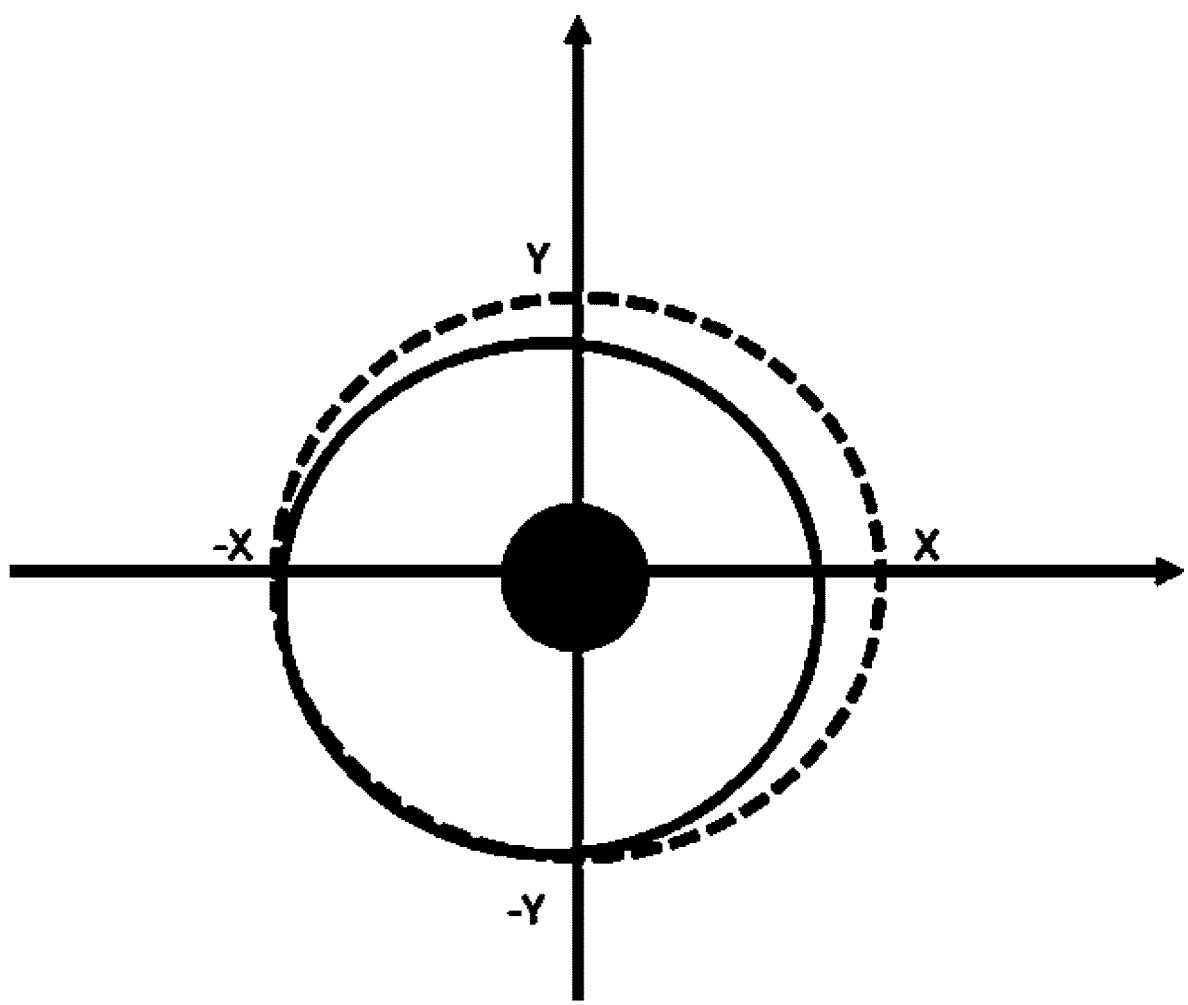
FIG. 7 is a top view of a left operating rod of the handle according to an embodiment of the present disclosure when adjusting the operating rod threshold value.

Referring to the prior art and FIG. 7, take as an example that the dotted line represents all the original positions of limit stroke of the left operating rod 31 (rocker). Namely, all the original operating rod threshold values of the left operating rod 31 are located at the positions indicated by the dotted line, where the −X to X direction is the horizontal direction, the −Y to Y direction is the vertical direction, and the intersection of the horizontal and vertical directions is the center position of the left operating rod 31, i.e., the top of the left operating rod 31 can swing around the center.

All operating rod threshold values of the left operating rod 31 can be divided into four parts (four quadrants), namely, XY part (the first quadrant), −XY part (the second quadrant), −X−Y part (the third quadrant) and −YX part (the fourth quadrant). The countless operating rod threshold values of the left operating rod 31 can be integrated into a disc shape on the XY plane.

When it is judged that the palm size data of the user is smaller than the palm size data corresponding to the operating rod threshold value of the operating rod of the handle, i.e., when it is judged that the user's palm size is smaller and cannot adapt to the current operating rod threshold value indicated by the dotted line, the different operating rod threshold values are decreased gradually in a trend of gradually decreasing adjustment amplitudes in a direction that faces toward the gripping portion of the handle.

It can be seen from FIG. 4 that the first gripping portion 1 on the left side is on the left side of the left operating rod 31, so the left hand is on the left side of the left operating rod 31. Since the palm size of the user is smaller, it is not convenient for the left hand to move the left operating rod 31 to the limit stroke in the first quadrant, while it is easy for the left hand to move the left operating rod 31 to the limit stroke in the third quadrant. Therefore, the operating rod threshold values in the first quadrant which faces away from the first gripping portion 1 are decreased, and the adjustment amplitudes are larger; the operating rod threshold values in the second quadrant and the fourth quadrant are decreased, and the adjustment amplitudes are relatively smaller; the reduction amplitudes of the operating rod threshold values in the third quadrant that face toward the first gripping portion 1 should be the minimum, or even 0 (i.e., they may not be adjusted).

At the same time, the different operating rod threshold values in each quadrant should also be adjusted according to the mode of "decreasing different operating rod threshold values gradually in a trend of gradually decreasing adjustment amplitudes in a direction that faces toward the gripping portion".

The solid line part in FIG. 7 is the operating rod threshold value after adjusted of the left operating rod 31. It can be seen that the adjusting process from the dotted line to the solid line is the process of "when the palm size data is smaller than a palm size data corresponding to the operating rod threshold value of the operating rod of the handle, decreasing different operating rod threshold values gradually in a trend of gradually decreasing adjustment amplitudes in a direction that faces toward the gripping portion".

Similarly to the above, take as an example that the solid line represents all the original positions of limit stroke of the left operating rod 31 (rocker), namely, all the original operating rod threshold values of the left operating rod 31 are located at the positions indicated by the solid line. When it is judged that the palm size data of the user is larger than the palm size data corresponding to the operating rod threshold value of the operating rod of the handle, i.e., when it is judged that the user's palm size is larger and cannot adapt to the operating rod threshold values indicated by the current solid line, the different operating rod threshold values will be increased gradually in a trend of gradually increasing adjustment amplitudes in a direction that faces away from the gripping portion. The specific adjustment mode may refer to the above and will not be described in detail here.

Figure 8:
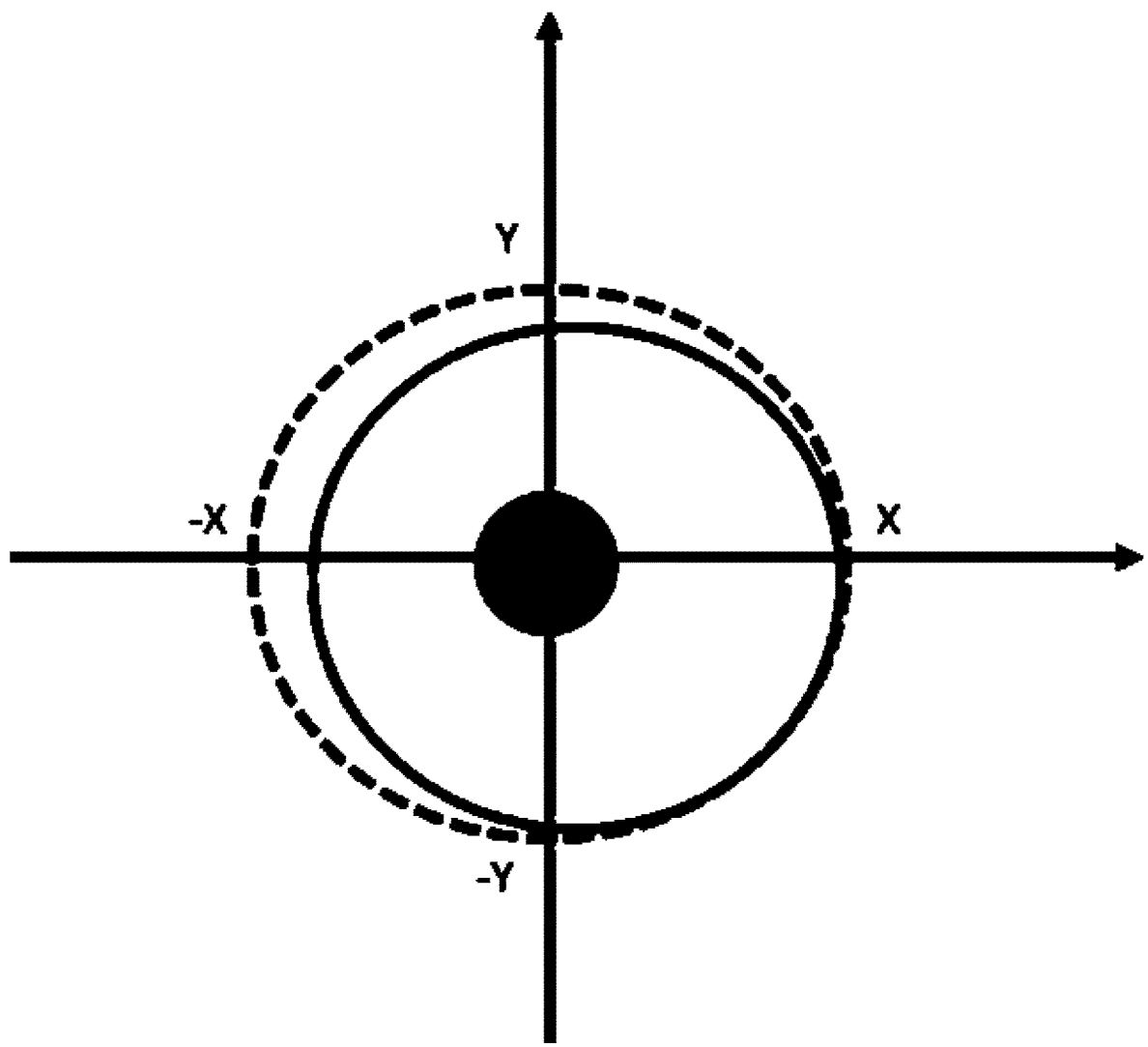
FIG. 8 is a top view of a right operating rod of the handle according to an embodiment of the present disclosure when adjusting the operating rod threshold value.

Referring to FIG. 8 which shows the adjustment mode of the right operating rod 32, similarly to the above, the process of adjusting from the dotted line to the solid line is the process of "when the palm size data is smaller than a palm size data corresponding to the operating rod threshold value of the operating rod of the handle, decreasing different operating rod threshold values gradually in a trend of gradually decreasing adjustment amplitudes in a direction that faces toward the gripping portion", while the process of adjusting from the solid line to the dotted line is the process of "when the palm size data is larger than a palm size data corresponding to the operating rod threshold value of the operating rod of the handle, increasing different operating rod threshold values gradually in a trend of gradually increasing adjustment amplitudes in a direction that faces away from the gripping portion".

It can be seen that, in such a way, the operating rod threshold values at different positions can be adjusted differently, and thus the operational comfort of the user can be further improved. Of course, the adjustment mode of the push rod in the prior art is similar to the above, which will not be described in detail here.

Figure 3:
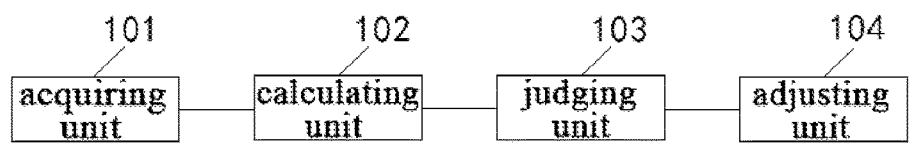
FIG. 3 is a block diagram of the structure of a system for adjusting an operating rod threshold value according to an embodiment of the present disclosure.

The embodiment of the present disclosure also provides a system for adjusting an operating rod threshold value, as shown in FIG. 3. The function and working principle of each component of the system for adjusting an operating rod threshold value may refer to the method for adjusting an operating rod threshold value as described above. The system for adjusting an operating rod threshold value comprises:

an acquisition unit 101 for acquiring position data of palm feature points when a user is grasping a gripping portion of a handle;

a calculation unit 102 for obtaining palm size data according to the position data of the palm feature points;

a judging unit 103 for judging whether the operating rod threshold value of the handle is within a suitable operating threshold range corresponding to the palm size data according to the palm size data; and an adjusting unit 104 for adjusting the operating rod threshold when the operating rod threshold value of the operating rod of the handle is not within the suitable operating threshold range corresponding to the palm size data, so that the operating rod threshold value after adjusted is suitable for the user.

Further, the judging unit 103 may be for:

judging whether the operating rod threshold value of the operating rod of the handle is within the suitable operating threshold range corresponding to the palm size data.

Further, the judging unit 103 may further comprise:

a palm size range determining subunit for determining a palm size range in which the palm size data is;

a suitable operating threshold range determining subunit for determining a corresponding suitable operating threshold range according to the palm size range; and a judging subunit for judging whether the operating rod threshold value of the operating rod of the handle is within the suitable operating threshold range.

The adjusting unit 104 may be further for:

when the palm size data is smaller than a palm size data corresponding to the operating rod threshold value of the operating rod of the handle, decreasing different operating rod threshold values gradually in a trend of gradually decreasing adjustment amplitudes in a direction that faces toward the gripping portion;

when the palm size data is larger than a palm size data corresponding to the operating rod threshold value of the operating rod of the handle, increasing different operating rod threshold values gradually in a trend of gradually increasing adjustment amplitudes in a direction that faces away from the gripping portion.

The adjusting unit 104 may be further for:

according to suitable operating threshold ranges corresponding to the palm size data of the left and right hands, adjusting respectively the operating rod threshold values of left and right operating rods of the handles to middle values of their corresponding suitable operating threshold ranges, so that the operating rod threshold values after adjusted are suitable for the user.

The adjusting unit 104 may be further for:

according to a suitable operating threshold range corresponding to the palm size data of a smaller hand in the left and right hands, adjusting the operating rod threshold values of left and right operating rods of the handles to a middle value of the suitable operating threshold range, so that the operating rod threshold values after adjusted are suitable for the user.

An embodiment of the present disclosure further provides a device for adjusting an operating rod threshold value, comprising:

a memory for storing a computer program; and a processor for implementing the steps of the methods for adjusting an operating rod threshold value as described above when executing the computer program.

An embodiment of the present disclosure further provides a handle, which comprises the device for adjusting an operating rod threshold value as described above. It further comprises a size collecting module for collecting a palm size data of a user.

Figure 9:
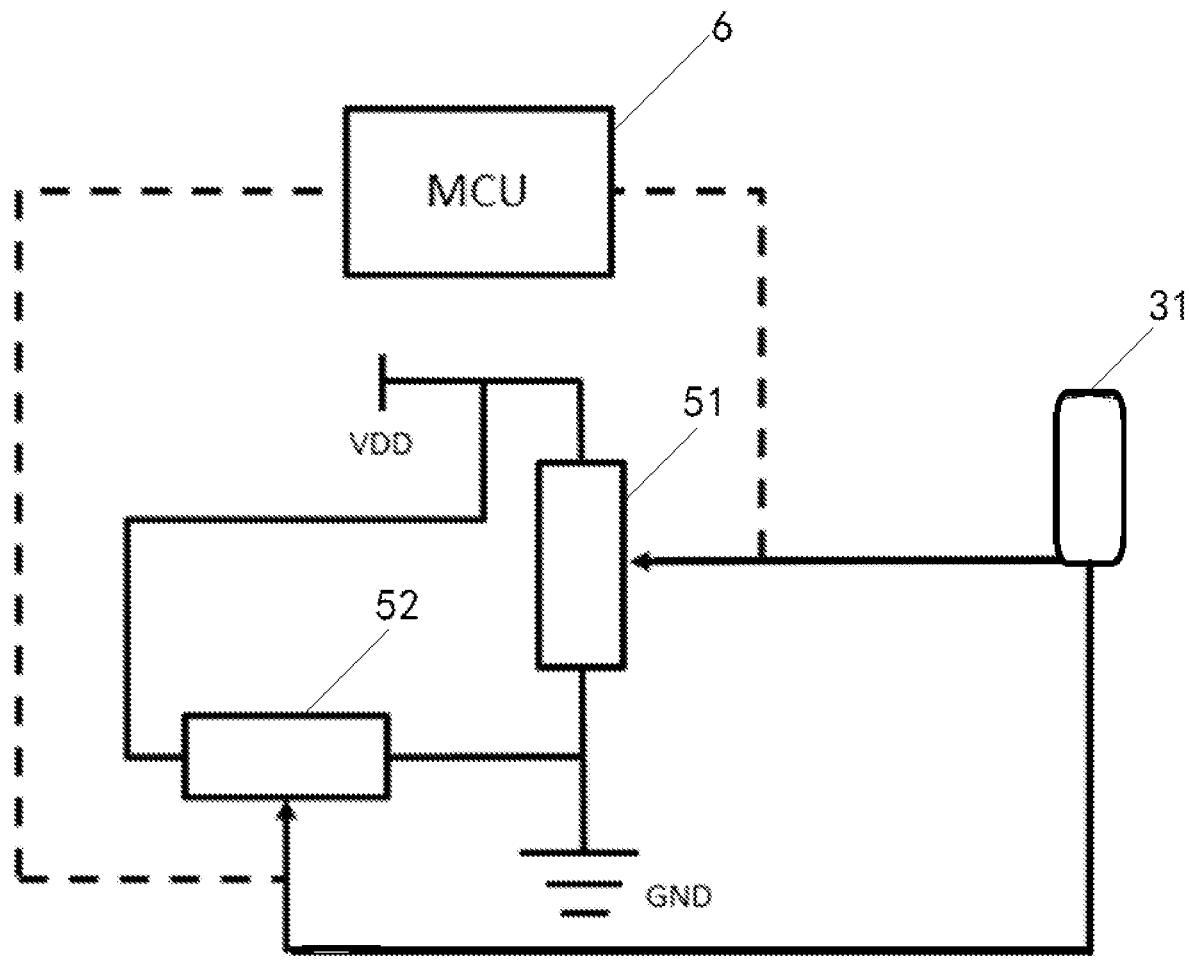
FIG. 9 is a working principle diagram of the operating rod of the handle according to an embodiment of the present disclosure.

As shown in FIG. 4 and FIG. 9, a left operating rod 31 and a right operating rod 32 may be provided between the first gripping portion 1 and the second gripping portion 2, and the size collecting module may be specifically a palm size collection panel 4.

FIG. 9 shows the working principle of the left operating rod 31. Taking the movement of the left operating rod 31 in the horizontal direction as an example, the left operating rod 31 is connected with a first sliding rheostat 51 and a second sliding rheostat 52, and the first sliding rheostat 51 and the second sliding rheostat 52 are connected with a controller 6, which may be specifically an MCU (Microcontroller Unit), etc. When the left operating rod 31 moves in the horizontal direction, the controller 6 can detect the resistance changes of the first sliding rheostat 51 and the second sliding rheostat 52, and calculate the distance of the left operating rod 31 moving in the horizontal direction based on the resistance changes. The movement mode of the left operating rod 31 in other directions is similar to the above, which will not be repeated here.

As shown in FIG. 5, the palm size collection panel 4 may be specifically a contact sensing device or a visual device. Taking the contact sensing device as an example, when a whole palm is placed on the palm size collection panel 4, the feature points of the palm can be obtained. The feature points are usually located on the contour of the palm, and thus the palm size data can be obtained. Its specific acquisition process and principle may refer to the prior art, and will not be repeated here.

The palm size collection panel 4 may cover the gripping portion of the handle. Since the gripping portion is usually an irregular curved surface, obviously, the palm size collection panel 4 should realize its function through a flexible circuit board. It can be seen from FIG. 4 that the first gripping portion 1 and the second gripping portion 2 may be both provided with a palm size collection panel 4. When the user needs to manipulate the handle, no matter whether he grasps the first gripping portion 1 with the left hand or grasps the second gripping portion 2 with the right hand, the palm size data of the user can be collected through the palm size collection panel 4.

It should be noted that in this specification, relational terms such as "first" and "second" are only used to distinguish one entity from other entities, and do not necessarily require or imply any actual relationship or order between these entities.

The handle, the method for adjusting an operating rod threshold value, the system for adjusting an operating rod threshold value and the device for adjusting an operating rod threshold value according to the present disclosure have been described in detail above. In the present disclosure, specific examples are used to explain the principle and implementation of the present disclosure. The above embodiments are only used to help understand the methods and core ideas of the present disclosure. It should be pointed out that for those skilled in the art, the present disclosure may be improved and modified without departing from the principle of the present disclosure, and these improvements and modifications shall also fall within the scope of protection of the claims of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for adjusting an operating rod threshold value, comprising:

acquiring position data of palm feature points when a user is grasping a gripping portion of a handle;

obtaining palm size data according to the position data of the palm feature points;

judging whether the operating rod threshold value of the handle is within a suitable operating threshold range corresponding to the palm size data, and if not, adjusting the operating rod threshold value so that the operating rod threshold value after adjusted is suitable for the user.

2. The method for adjusting an operating rod threshold value according to claim 1, wherein the position data of the palm feature points comprise: position data of multiple edge points of the palm, and position data of three finger webs between four fingers except the thumb.

3. The method for adjusting an operating rod threshold value according to claim 1, wherein the position data of the palm feature points comprise: position data of index finger, middle finger, ring finger and little finger of the palm;

the step of obtaining palm size data according to the position data of the palm feature points comprises:

when it is judged from the position data of index finger, middle finger, ring finger and little finger that the index finger and middle finger are located on a front surface of the gripping portion, and the ring finger and little finger are located on a bottom surface of the gripping portion, obtaining a preset first palm size data as the palm size data;

when it is judged from the position data of index finger, middle finger, ring finger and little finger that only the index finger is located on the front surface of the gripping portion, and the middle finger, ring finger and little finger are all located on the bottom surface of the gripping portion, obtaining a preset second palm size data as the palm size data, wherein a palm size corresponding to the second palm size data is smaller than a palm size corresponding to the first palm size data; and when it is judged from the position data of index finger, middle finger, ring finger and little finger that the index finger, middle finger, ring finger and little finger are all located on the bottom surface of the gripping portion, obtaining a preset third palm size data as the palm size data, wherein a palm size corresponding to the third palm size data is smaller than a palm size corresponding to the second palm size data.

4. The method for adjusting an operating rod threshold value according to claim 1, wherein the step of judging whether the operating rod threshold value of the operating rod of the handle is within a suitable operating threshold range corresponding to the palm size data comprises:

determining a palm size range in which the palm size data is;

determining a corresponding suitable operating threshold range according to the palm size range; and judging whether the operating rod threshold value of the operating rod of the handle is within the suitable operating threshold range.

5. The method for adjusting an operating rod threshold value according to claim 1, wherein the step of adjusting the operating rod threshold value so that the operating rod threshold value after adjusted is suitable for the user comprises:

when the palm size data is smaller than a palm size data corresponding to the operating rod threshold value of the operating rod of the handle, decreasing different operating rod threshold values gradually in a trend of gradually decreasing adjustment amplitudes in a direction that faces toward the gripping portion;

when the palm size data is larger than a palm size data corresponding to the operating rod threshold value of the operating rod of the handle, increasing different operating rod threshold values gradually in a trend of gradually increasing adjustment amplitudes in a direction that faces away from the gripping portion.

6. The method for adjusting an operating rod threshold value according to claim 1, wherein the step of adjusting the operating rod threshold value so that the operating rod threshold value after adjusted is suitable for the user comprises:

according to suitable operating threshold ranges respectively corresponding to the palm size data of the left and right hands, adjusting respectively the operating rod threshold values of left and right operating rods of the handles to middle values to middle values of their corresponding suitable operating threshold ranges, so that the operating rod threshold values after adjusted are suitable for the user.

7. The method for adjusting an operating rod threshold value according to claim 1, wherein the step of adjusting the operating rod threshold value so that the operating rod threshold value after adjusted is suitable for the user comprises:

according to a suitable operating threshold range corresponding to the palm size data of a smaller hand in the left and right hands, adjusting the operating rod threshold values of left and right operating rods of the handles to a middle value of the suitable operating threshold range, so that the operating rod threshold values after adjusted are suitable for the user.

8. A device for adjusting an operating rod threshold value, comprising:

a memory for storing a computer program; and a processor for implementing the steps of the method for adjusting an operating rod threshold value according to claim 1 when executing the computer program.

9. The method for adjusting an operating rod threshold value according to claim 2, wherein the step of adjusting the operating rod threshold value so that the operating rod threshold value after adjusted is suitable for the user comprises:

when the palm size data is smaller than a palm size data corresponding to the operating rod threshold value of the operating rod of the handle, decreasing different operating rod threshold values gradually in a trend of gradually decreasing adjustment amplitudes in a direction that faces toward the gripping portion;

when the palm size data is larger than a palm size data corresponding to the operating rod threshold value of the operating rod of the handle, increasing different operating rod threshold values gradually in a trend of gradually increasing adjustment amplitudes in a direction that faces away from the gripping portion.

10. The method for adjusting an operating rod threshold value according to claim 3, wherein the step of adjusting the operating rod threshold value so that the operating rod threshold value after adjusted is suitable for the user comprises:

when the palm size data is smaller than a palm size data corresponding to the operating rod threshold value of the operating rod of the handle, decreasing different operating rod threshold values gradually in a trend of gradually decreasing adjustment amplitudes in a direction that faces toward the gripping portion;

when the palm size data is larger than a palm size data corresponding to the operating rod threshold value of the operating rod of the handle, increasing different operating rod threshold values gradually in a trend of gradually increasing adjustment amplitudes in a direction that faces away from the gripping portion.

11. The method for adjusting an operating rod threshold value according to claim 4, wherein the step of adjusting the operating rod threshold value so that the operating rod threshold value after adjusted is suitable for the user comprises:

when the palm size data is smaller than a palm size data corresponding to the operating rod threshold value of the operating rod of the handle, decreasing different operating rod threshold values gradually in a trend of gradually decreasing adjustment amplitudes in a direction that faces toward the gripping portion;

when the palm size data is larger than a palm size data corresponding to the operating rod threshold value of the operating rod of the handle, increasing different operating rod threshold values gradually in a trend of gradually increasing adjustment amplitudes in a direction that faces away from the gripping portion.

12. The method for adjusting an operating rod threshold value according to claim 2, wherein the step of adjusting the operating rod threshold value so that the operating rod threshold value after adjusted is suitable for the user comprises:

according to suitable operating threshold ranges respectively corresponding to the palm size data of the left and right hands, adjusting respectively the operating rod threshold values of left and right operating rods of the handles to middle values to middle values of their corresponding suitable operating threshold ranges, so that the operating rod threshold values after adjusted are suitable for the user.

13. The method for adjusting an operating rod threshold value according to claim 3, wherein the step of adjusting the operating rod threshold value so that the operating rod threshold value after adjusted is suitable for the user comprises:

according to suitable operating threshold ranges respectively corresponding to the palm size data of the left and right hands, adjusting respectively the operating rod threshold values of left and right operating rods of the handles to middle values to middle values of their corresponding suitable operating threshold ranges, so that the operating rod threshold values after adjusted are suitable for the user.

14. The method for adjusting an operating rod threshold value according to claim 4, wherein the step of adjusting the operating rod threshold value so that the operating rod threshold value after adjusted is suitable for the user comprises:

according to suitable operating threshold ranges respectively corresponding to the palm size data of the left and right hands, adjusting respectively the operating rod threshold values of left and right operating rods of the handles to middle values to middle values of their corresponding suitable operating threshold ranges, so that the operating rod threshold values after adjusted are suitable for the user.

15. The method for adjusting an operating rod threshold value according to claim 2, wherein the step of adjusting the operating rod threshold value so that the operating rod threshold value after adjusted is suitable for the user comprises:

according to a suitable operating threshold range corresponding to the palm size data of a smaller hand in the left and right hands, adjusting the operating rod threshold values of left and right operating rods of the handles to a middle value of the suitable operating threshold range, so that the operating rod threshold values after adjusted are suitable for the user.

16. The method for adjusting an operating rod threshold value according to claim 3, wherein the step of adjusting the operating rod threshold value so that the operating rod threshold value after adjusted is suitable for the user comprises:

according to a suitable operating threshold range corresponding to the palm size data of a smaller hand in the left and right hands, adjusting the operating rod threshold values of left and right operating rods of the handles to a middle value of the suitable operating threshold range, so that the operating rod threshold values after adjusted are suitable for the user.

17. The method for adjusting an operating rod threshold value according to claim 4, wherein the step of adjusting the operating rod threshold value so that the operating rod threshold value after adjusted is suitable for the user comprises: according to a suitable operating threshold range corresponding to the palm size data of a smaller hand in the left and right hands, adjusting the operating rod threshold values of left and right operating rods of the handles to a middle value of the suitable operating threshold range, so that the operating rod threshold values after adjusted are suitable for the user.

18. A device for adjusting an operating rod threshold value, comprising:

a memory for storing a computer program; and a processor for implementing the steps of the method for adjusting an operating rod threshold value according to claim 2 when executing the computer program.

19. A system for adjusting an operating rod threshold value, comprising:

an acquiring unit for acquiring position data of palm feature points when a user is grasping a gripping portion of a handle;

a calculating unit for obtaining palm size data according to the position data of the palm feature points;

a judging unit for judging whether the operating rod threshold value of the operating rod of the handle is within a suitable operating threshold range corresponding to the palm size data; and an adjusting unit for adjusting the operating rod threshold when the operating rod threshold value of the operating rod of the handle is not within the suitable operating threshold range corresponding to the palm size data, so that the operating rod threshold value after adjusted is suitable for the user.

\* \* \* \* \*